No. 695,938. Patented Mar. 25, 1902.
B. G. LAMME.
ALTERNATING CURRENT MOTOR.
(Application filed July 14, 1900.)
(No Model.)

WITNESSES:
C. L. Belcher
Birney Hines

INVENTOR
Benjamin G. Lamme
BY
Kesley G. Carr
ATTORNEY.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT MOTOR.

SPECIFICATION forming part of Letters Patent No. 695,938, dated March 25, 1902.

Application filed July 14, 1900. Serial No. 23,653. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Alternating-Current Motors, of which the following is a specification.

My invention relates to electric motors, and particularly to that class of motors in which the propelling energy is applied to only one of the members and which are generally designated as "induction-motors."

The object of my invention is to provide a motor of simple and inexpensive construction which may be adjusted for either of two rates of speed by a single movement of a simple controlling-switch.

The invention, as shown and described, is operated by a single-phase current and utilized for driving a fan; but it is not necessarily limited to this or any other single specific use.

Figure 1:
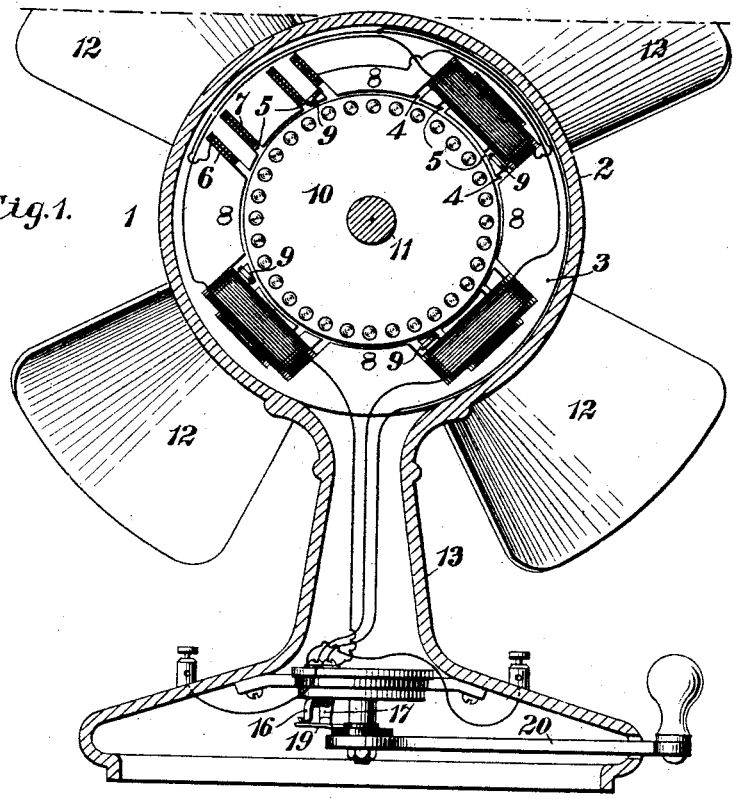
Figure 2:
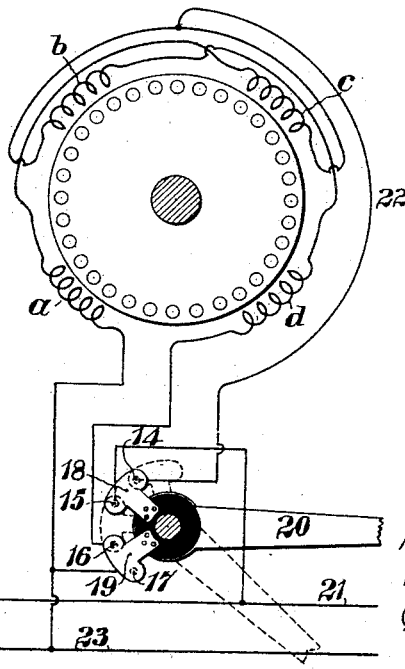

In the accompanying drawings, Figure 1 is a view, partially in section and partially in end elevation, of a motor constructed in accordance with my invention, and Fig. 2 is a diagram of the circuits of the motor shown in Fig. 1.

The primary member 2 of the motor 1 has a cylindrical core 3, preferably laminated, as is usual in motors of this general character, and provided with a plurality of sets of slots cut in the inner cylindrical face of the core. As shown, there are four sets of these slots; but any other even number of sets desired may be provided. Each of the sets, as shown, comprises two outside slots 4 and two inside slots 5, the sides of which are parallel to each other and to a radial plane, so that the coils 6 and 7 may be machine-wound and of the proper form and dimensions to be readily slipped into place in the slots and around the inclosed teeth or polar projections formed by such slots. While these coils will ordinarily be oblong in form, their arrangement may be generally described as concentric and the number of slots and coils belonging to each set may be greater than what is shown, or a single pair of slots and a single coil in lieu of the two pairs of slots and two coils may be employed. The arrangement shown is adopted because it enables me to employ a relatively long winding without making the slots of great width. The coils of each set are connected in series, so that they constitute, in effect, a single coil and may therefore be so designated, so far as the electric and magnetic conditions are concerned. The sets of slots and coils are so disposed as to provide intervening spaces 8 of considerable width, the inner faces of which lie in the same circle as the inner ends of the teeth or polar projections formed by the slots.

While I do not limit my invention to a structure having specific dimensions, it will generally be found desirable to so locate the core-slots that the portions 8 of the core shall afford paths for the magnetic fluxes that are approximately equal to those which are within the coils, so that when the coils are connected to produce the maximum number of poles there shall be a substantially uniform distribution of the magnetic fluxes in all of the poles.

It will usually be found desirable to employ in connection with the main propelling-coils closed secondary coils axially displaced with reference to the main coils in order that a sufficient displacement or distortion of the magnetic field may be obtained for starting purposes. I have indicated such starting-coils 9 in the drawings.

The secondary member 10 of the motor may be of the well-known squirrel-cage type, as indicated, and its shaft 11 may have mounted upon it the fan-blades 12, as indicated, or a suitable pulley in case it is desired to utilize the motor for other purposes than for revolving fan-blades.

The frame or stand 13, on which the parts already described are mounted, is provided at its base with stationary contact-terminals 14, 15, 16, and 17, to which are connected leads from the propelling-coils 6 and 7 and with which engage contact members 18 and 19, operated by suitable switch-arm 20.

In describing the operation it will be assumed that the coils of each set are so connected as to constitute, in effect, a single coil, and for convenience of description I will designate the several combination-coils as $a$, $b$, $c$, and $d$. It will be seen that with the controlling-switch in the position indicated in Fig. 2 the circuit will be from the supply-conductor 21 through terminal 15, contact 18, terminal 14, conductor 22, and coils $c$ and $a$ in series to supply-conductor 23 and from conductor 22 through coils $b$ and $d$, terminal piece 16, contact member 19, and terminal 17 to supply-conductor 23. With this arrangement of coils and circuits the coils are so energized as to produce poles of opposite sign that alternate with each other, as is usual in electric motors. This arrangement will afford the maximum motor speed. If now the switch-arm 20 be moved to the broken line opposite, the coils $a$, $b$, $c$, and $d$ will be connected in series, and the connection will be such that the magnetic poles produced thereby, which correspond in position to the coils, will all be of the same sign, the poles produced by coils $a$ and $c$ being unchanged and those produced by the coils $b$ and $d$ being reversed from what they were with the switch in the position already described. With the arrangement of coils indicated it follows that consequent poles will be produced in the intervening spaces 8 which will be of the same sign, but of the opposite sign to the poles corresponding in position to the coils. We shall thus have eight poles which alternate with each other in sign, and consequently the speed of the motor will be reduced substantially one-half.

As I have already indicated, the number of poles may be different from that indicated, and the construction may be otherwise modified as regards details without departing from the spirit and scope of my invention.

I claim as my invention—

1. In an induction-motor, a primary member having a cylindrical core provided with a plurality of sets of slots, those of each set being parallel to a radial plane and having concentric coils therein, in combination with a secondary member rotatably mounted within said primary member.

2. In an induction-motor, a primary member having a laminated, cylindrical core provided with a plurality of sets of slots and comparatively wide intervening spaces, the slots of each set being parallel to a radial plane and containing concentric coils, in combination with a secondary member rotatably mounted within the primary member.

3. In an induction-motor, the combination with a plurality of actuating-coils or sets of coils in combination with a switch for connecting said coils or sets of coils in two parallel groups for a minimum number of corresponding magnetic poles which shall be alternately of opposite sign and for connecting said coils or sets of coils in series to produce a maximum number of magnetic poles, those corresponding in position to the coils being of the same sign.

4. In an alternating-current induction-motor, a primary member comprising a core having a cylindrical inner periphery provided with slots localized in sets, and with intervening relatively wide, unslotted spaces and coils located in said slots, in combination with a controlling device adjustable to so connect the coils as to produce poles alternating in sign and corresponding to the coils in number and position for one rate of speed and also adjustable to so connect the coils as to produce corresponding poles of one sign and intervening consequent poles of the opposite sign.

5. In an alternating-current, two-speed motor, a primary member comprising a core having a cylindrical inner periphery provided with localized slots and relatively wide intervening spaces and coils located in said slots, in combination with means for connecting said coils to produce either poles corresponding in number and position to the coils or double that number.

6. In an alternating-current motor, a primary member comprising a core having a cylindrical inner periphery provided with localized slots and relatively wide intervening spaces and coils located in said slots, in combination with means for connecting said coils to produce poles corresponding in number and position to the coils and alternating in sign and for connecting said coils to produce corresponding poles of the same sign and intervening, consequent poles of the opposite sign.

7. In an alternating-current motor, a primary member comprising a core having a cylindrical inner periphery provided with localized slots containing coils, the core portions between the coils being approximately equal to the portions surrounded by them, in combination with means for connecting said coils to produce poles corresponding in number and position to the coils and alternating in sign and for connecting said coils to produce corresponding poles of the same sign and intervening, consequent poles of the opposite sign.

In testimony whereof I have hereunto subscribed my name this 9th day of July, 1900.

BENJ. G. LAMME.

Witnesses:
  WESLEY G. CARR,
  BIRNEY HINES.